(12) United States Patent
Bai et al.

(10) Patent No.: US 8,134,802 B2
(45) Date of Patent: Mar. 13, 2012

(54) WRITER AND READER ARRANGEMENTS FOR SHINGLED WRITING

(75) Inventors: Zhigang Bai, Milpitas, CA (US); Yan Wu, Cupertino, CA (US); Kenichi Takano, Santa Clara, CA (US)

(73) Assignee: Headway Technologies, Inc., Milpitas, CA (US)

( * ) Notice: Subject to any disclaimer, the term of this patent is extended or adjusted under 35 U.S.C. 154(b) by 266 days.

(21) Appl. No.: 12/589,829

(22) Filed: Oct. 29, 2009

(65) Prior Publication Data

US 2011/0102942 A1    May 5, 2011

(51) Int. Cl.
*G11B 5/127* (2006.01)
(52) U.S. Cl. .................................................... 360/125.3
(58) Field of Classification Search ............ 360/125.03, 360/125.07, 125.06, 125.08, 125.13, 125.31; 29/603.07, 603, 15
See application file for complete search history.

(56) References Cited

U.S. PATENT DOCUMENTS

| | | | |
|---|---|---|---|
| 4,858,048 A * | 8/1989 | Hayakawa et al. ........... 360/121 |
| 6,967,810 B2 | 11/2005 | Kasiraj et al. | |
| 7,372,656 B2 | 5/2008 | Satoh et al. | |
| 7,490,212 B2 | 2/2009 | Kasiraj et al. | |
| 2005/0259356 A1* | 11/2005 | Han et al. ...................... 360/126 |
| 2011/0086182 A1* | 4/2011 | Matono et al. ................ 427/553 |

OTHER PUBLICATIONS

"The Feasibilty of Magnetic Recording at 10 Terabits Per Square Inch on Conventional Media," by Roger Wood et al., IEEE Transactions on Magnetics, vol. 45, No. 2, Feb. 2009, ppl. 917-923.
"Shingled Recording for 2-3 Tbit/in squared," by Simon Greaves et al., IEEE Transactions on Magnetics, vol. 45, No. 10, Oct. 2009, pp. 3823-3829.
Co-pending US Patent HT08-012, U.S. Appl. No. 12/231,756, filed Sep. 5, 2008, "A Method to Make an Integrated Side Shield PMR Head with Non-Conformal Side Gap," assigned to the same assignee as the present invention.

* cited by examiner

*Primary Examiner* — Allen Cao
(74) *Attorney, Agent, or Firm* — Saile Ackerman LLC; Stephen B. Ackerman

(57) ABSTRACT

A sloped reader is disclosed that reduces skew between reader and written transitions in shingled writing. The reader is formed between surfaces of S1 and S2 shields that are aligned parallel to the sloped reader. A PMR writer is described that straightens transition curvature and reduces signal-to-noise ratio in shingled writing. In one embodiment, a symmetrical writer with a bowed trailing edge where two corners have a greater pole height than a center portion may be used for either right corner or left corner shingled writing. In a second embodiment, an asymmetrical writer is formed with a straight and sloped trailing edge such that the write corner has a greater pole height than the opposite corner on the trailing edge. The bowed angle in the symmetrical writer and slope angle in the asymmetrical writer is between 5 and 45 degrees and preferably between 10 and 30 degrees.

39 Claims, 14 Drawing Sheets

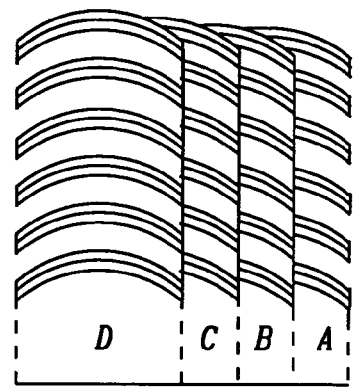
FIG. 1 - Prior Art
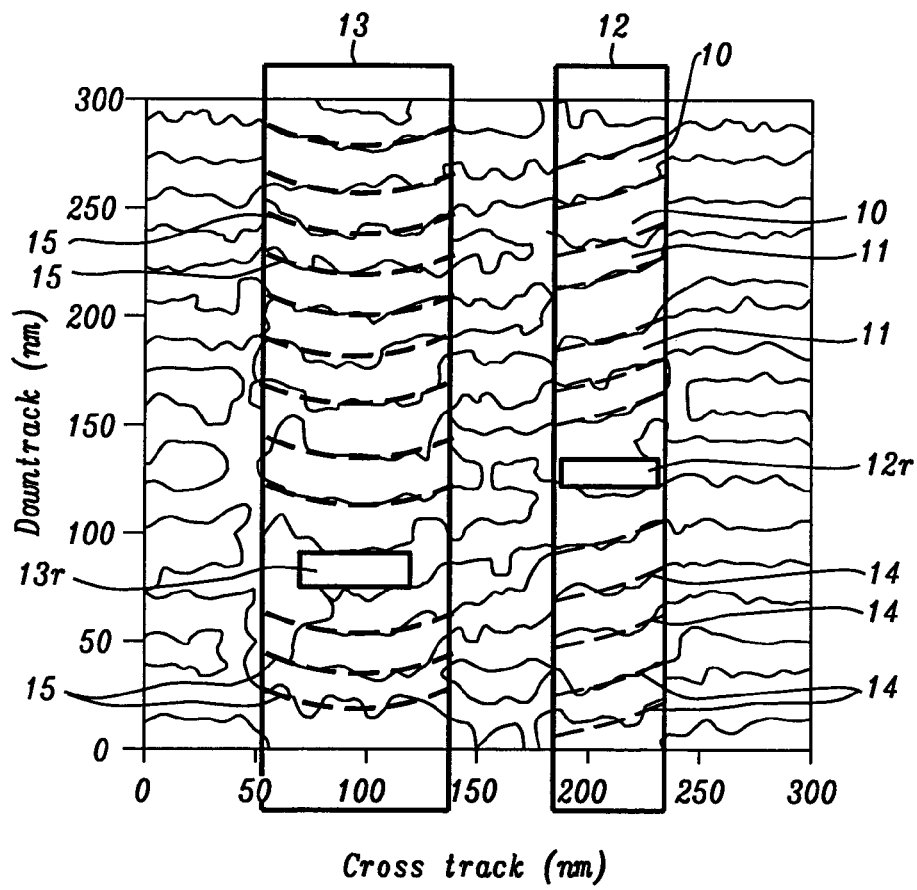
FIG. 2 - Prior Art

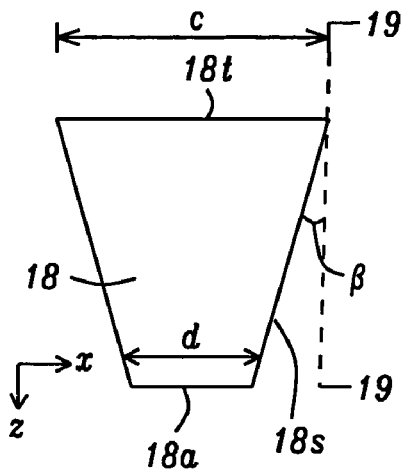
*FIG. 3 - Prior Art*
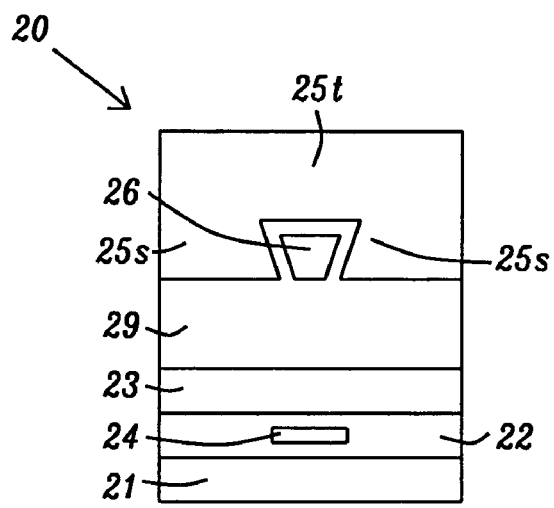
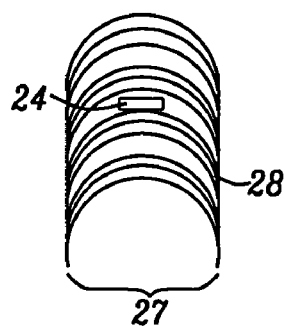
*FIG. 4a - Prior Art*

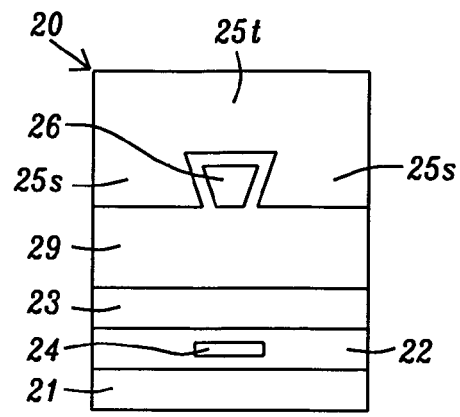
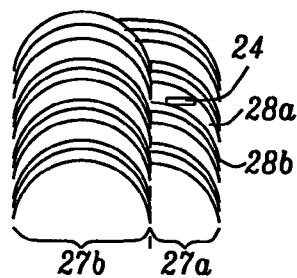
FIG. 4b — Prior Art
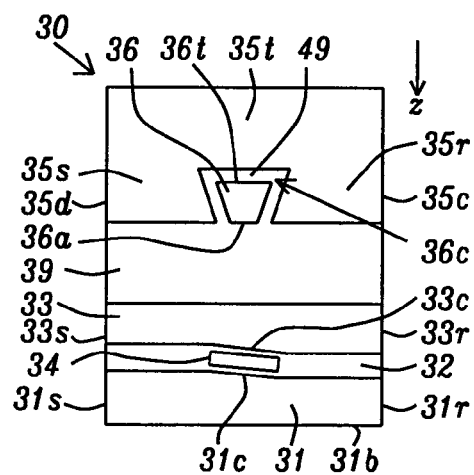
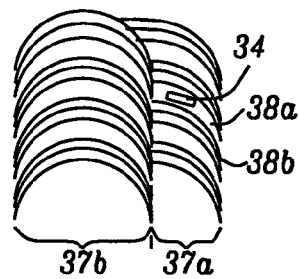
FIG. 5a

_US 8,134,802 B2_

WRITER AND READER ARRANGEMENTS FOR SHINGLED WRITING

RELATED PATENT APPLICATION

This application is related to, Ser. No. 12/231,756, filing date Sep. 5, 2008; assigned to the same assignee as the current invention and which is herein incorporated by reference in its entirety.

FIELD OF THE INVENTION

The invention relates to reader and writer structures for shingled writing wherein the reader may be formed at an angle with respect to a substrate to resolve the issue of relative skew between the reader and written tracks, and a trailing edge of the write pole at the ABS may have a slanted angle with respect to the wafer substrate to provide straighter transitions and reduced skew of written transitions for higher signal to noise ratio (SNR).

BACKGROUND OF THE INVENTION

Shingled writing is a form of PMR (perpendicular magnetic recording) and has been proposed for future high density magnetic recording by R. Wood et al. in "The Feasibility of Magnetic Recording at 10 Terabits Per Square Inch on Conventional Media", IEEE Trans. Magn., Vol. 45, pp. 917-923 (2009). In this scheme, tracks are written in a sequential manner from an inner diameter (ID) to an outer diameter (OD), from OD to ID, or from OD and ID towards a middle diameter (MD) in a radial region of a disk in a hard disk drive (HDD). In other words, a first track is partially overwritten on one side when a second track adjacent to the first track is written, and subsequently a third track is written that partially overwrites the second track, and so forth. Track widths are defined by the squeeze position or amount of overwrite on the next track rather than by the write pole width as is the case in today's hard drives.

One of the main advantages of shingled writing is that write pole width no longer needs to scale with the written track width. Thus, the opportunity for improved writability and higher device yield is not restricted by using pole width as a critical dimension to be tightly controlled. Secondly, adjacent track erasure (ATE) becomes less of an issue because tracks are written sequentially in a cross-track dimension and only experience a one time squeeze from the next track. On the other hand, shingled writing has a unique issue that must be encountered. Because of writing from only one corner of the write pole and the one side squeeze associated with each track, track edge writing and transition curvature have larger impacts on the written tracks compared to conventional writing. This effect is depicted in FIG. 1 where four tracks A-D are sequentially overlaid on one another such that track B partially overwrites track A, track C partially overwrites track B, and track D overwrites a side of track C. Due to the one-side squeeze and the shape of the field contour at one side of the write pole, written transitions will be skewed even when the writer and reader are at zero skew. Note that the transitions shown as alternating light and dark colored bands are all sloped (skewed) with respect to the cross-track direction for tracks A-C that have a one side squeeze.

Referring to FIG. 2, micromagnetic simulated written tracks also confirm that transitions in one-sided squeezed tracks are skewed. The simulated track image is taken from a paper DC-08 entitled "Write head modeling for shingled writing" by Y. Kanai during a presentation at Intermag 2009 in Sacramento, Calif. A series of tracks is written from right to left with zero degree writer skew. The track depicted within rectangle 12 was squeezed from the left side and clearly has transitions tilted in one direction as indicated by dashed line 14. Transitions 10 generally alternate with transitions 11 in a down track direction. The last written track shown within rectangle 13 is representative of written tracks in current hard drives and has a left-right symmetric transition curvature as indicated by dashed lines 15. A hypothetical reader 12r is overlaid on the squeezed track within rectangle 12 to illustrate the impact of the shingled written track. In this example, there is an angle of 10 degrees between the transition slope and reader 12r which will cause read back pulse width and resolution degradation thereby affecting SNR and bit error rate (BER) performance. On the other hand, a hypothetical reader 13r overlaid on the center of the last written track in rectangle 13 indicates there is no effect of the transition curvature 15 on SNR and BER in conventional tracks. However, a conventional writer pole design cannot meet the requirements of shingled writing. Thus, an improved write pole structure is needed to reduce the transition curvature and skew of written tracks in shingled writing at zero head skew.

Although it may appear trivial to change the skew profile of the head across the stroke to compensate for transition skew in tracks that are squeezed on one side during a shingled writing process, it should be understood that such an adjustment will not solve the aforementioned issue of relative skew between the written tracks and the reader since the reader and writer skews both change together when done on a slider at head gimbal assembly (HGA) level. Therefore, a solution is still needed to compensate for the relative skew between reader and written tracks in shingled writing.

A search of the prior art revealed the following references. In U.S. Pat. No. 6,967,810, a shingled writing method is described in which a random update zone where the write element has no skew can be interposed between inner and outer regions of a disk. In related U.S. Pat. No. 7,490,212, a shingled writing method is disclosed wherein two or more contiguous data tracks establish a band, and a band may store data from only one file. U.S. Pat. No. 7,372,656 describes a shingled writing direction that is defined by assigning Logical Block Addresses (LBAs) from an outer circular side to an inner circular side for both surfaces of a recording medium.

SUMMARY OF THE INVENTION

One objective of the present invention is to reduce the transition curvature in shingled writing.

Another objective of the present invention is to reduce the skew of written tracks in shingled writing at zero head skew.

According to the present invention, the first objective is achieved with a merged read/write structure in which the write pole shape is modified to reduce skew of written tracks or transition curvature in shingled writing. The second objective is realized with a conventional writer design but where the reader is formed on a shallow slope with respect to a substrate to provide a built in relative skew between written tracks and reader. In the sloped reader structure, the write pole has a trailing edge with a write corner and a non-write corner, two sides, and a leading edge along the ABS. The reader is preferably aligned in a down track direction with respect to the write pole. In one aspect, the write pole is separated from two side shields and a trailing shield by a side gap and write gap, respectively. The leading edge of the write pole faces a top surface of a second (S2) shield in the reader structure. The S2 shield has two parallel sides formed perpendicular to the ABS and substrate, and a bottom surface facing the reader wherein the bottom surface has two flat sections at either end proximate to the parallel sides and a middle section that is sloped with respect to the plane of a substrate. There is a gap layer with a substantially uniform thickness that separates the S2 shield and a S1 shield. Within the gap layer is the reader with a top surface and bottom surface aligned parallel to the middle section of the S2 shield and a sloped middle section of the S1 shield. The S1 shield has two parallel sides aligned with the parallel sides of the S2 shield, a bottom surface formed on a substrate, and a top surface with two flat portions on either end and a sloped middle portion that is formed parallel to the sloped middle portion of the S2 shield. Between the sloped middle portions of the S1 and S2 shields is a reader having two ends adjacent to the gap layer as well as the top and bottom surfaces that are sloped at an angle of 0 to 25 degrees, and preferably 5 to 10 degrees with respect to the plane of the substrate. Thus, the end of the reader aligned below the write corner is a greater distance from the trailing edge of the write pole than the end of the reader aligned below the non-write corner.

A method of fabricating a sloped reader begins with deposition of a S1 shield on a substrate. A photoresist layer is coated on a top surface of the S1 shield and patterned to leave a mask along a first side while the second side and a middle portion thereof are unprotected. Then a shallow ion beam etch (IBE) process is performed in a unidirectional fashion to form a sloped middle section of the S1 shield top surface. After the photoresist mask is removed, the first side of the S1 shield that was protected by the phororesist during the IBE step has a greater thickness than the second side in a down track direction. Both end sections of the top surface are essentially parallel to the plane of the substrate while the middle section is sloped from the first side to the second side. A lower portion of a gap layer and a reader stack of layers are sequentially deposited in a conformal manner on the S1 shield top surface and then a standard patterning and etching sequence is performed to define a reader on the sloped portion of the gap layer. A hard bias layer may be formed adjacent to both ends of the reader and then an upper portion of the gap layer is conformally deposited on the reader and on the lower gap portion. Subsequently, the S2 shield is deposited on the upper gap layer and planarized so that a top S2 shield surface is parallel to the substrate. A write head is then formed by a conventional method on the S2 shield. The write corner for "right corner" shingled writing is proximate to the second side of the writer structure that is aligned above the second side of the S1/S2 shield structure.

In an alternative embodiment for "left corner" shingled writing where the write corner of the write pole is proximate to the first side of the writer structure, the aforementioned process is modified so that the photoresist mask is formed on the end portion of the S2 shield adjacent to the second side. Thus, the IBE removes a top portion of the S2 shield adjacent to the first side of the reader structure and part of the middle portion of the top surface such that the resulting sloped middle section slopes toward the first side.

There are also embodiments of the present invention that modify the write pole in order to reduce transition curvature in the written tracks. In one embodiment, there is a symmetrical write pole that is separated from a trailing shield by a write gap and from a side shield by a side gap. The trailing edge of the write pole at the ABS is non-planar and is formed at an angle $\alpha$ with respect to a plane that intersects both corners of the trailing edge and is parallel to the substrate. The trailing edge is bowed toward the substrate such that the center of the trailing edge has the lowest pole height. Sidewalls of the main pole that connect the trailing edge corners to the leading edge have a bevel angle $\beta$ with respect to a plane perpendicular to the substrate. In another aspect, the shield structure around the write pole at the ABS may also include a leading shield proximate to the leading edge of the write pole.

In a second embodiment that relates to write pole shape, the write pole is asymmetric with respect to a plane that is perpendicular to the substrate and bisects the leading edge and trailing edge. The distance between a first corner of the leading edge and first corner of the trailing edge along a first side of the write pole is less than the distance between a second corner of the leading edge and a second corner of the trailing edge along a second side. The second corner on the trailing edge designated as the right corner is used for shingled writing and the side shield is formed proximate to only the second side. The trailing edge is straight but is formed at an angle $\alpha'$ with respect to a plane that intersects the second corner and is parallel to the substrate. The second side has a bevel angle $\beta'$ with respect to a plane that intersects the second corner and is perpendicular to the substrate. In another embodiment, the asymmetric write pole for right corner writing may further comprise a side shield proximate to the first side. Furthermore, there may be a leading shield to provide a full wrap around shield of the write pole at the ABS.

There is another embodiment for write pole shape that has an asymmetric write pole designed for left corner writing. In this case, the distance between the first corner of the leading edge and first corner of the trailing edge along a first side of the write pole is greater than the distance between a second corner of the leading edge and a second corner of the trailing edge along a second side. The first corner of the trailing edge is designated as the left corner and is used for shingled writing. The trailing edge is straight but is formed at an angle $\alpha''$ with respect to a plane that intersects the first corner and is parallel to the substrate. The second side has a bevel angle $\beta''$ with respect to a plane that intersects the first corner and is perpendicular to the substrate. Alternatively, the asymmetric write pole for left corner writing may have a side shield proximate to the second side. Moreover, there may be a leading shield to provide a full wrap around shield at the ABS.

A method is provided for forming a symmetrical write pole with a sloped trailing edge and for making an asymmetrical write pole. Both include plating and planarization of a write pole in a dielectric layer. The dielectric layer is partially protected while a slanted angle IBE process selectively removes a portion of the trailing side of the write pole to form either a bowed trailing edge for a symmetrical write pole or a sloped trailing edge for an asymmetrical write pole.

BRIEF DESCRIPTION OF THE DRAWINGS

FIG. 1 is an illustration of shingled writing in a cross track direction from right to left.

FIG. 2 is an illustration from a prior art reference showing micromagnetic modeled written tracks using shingled writing from right to left where the last written track within the large rectangle is not squeezed.

FIG. 3 is a cross-sectional view from an ABS plane that shows a prior art PMR main pole with trapezoid shape, bevel angle, and a flat trailing edge parallel to a substrate.

FIG. 4a (top) and FIG. 4b (top) are cross-sectional views of reader and writer without relative skew while FIG. 4a (bottom) shows no relative skew between written track and reader structure in conventional writing and FIG. 4b (bottom) shows relative skew between written track and reader in shingled writing.

FIG. 5a is a cross-sectional view of a writer for right corner shingled writing with built in relative skew in the reader and FIG. 5b is a cross-sectional view of a writer for left corner writing with built in relative skew in the reader. The reader is superimposed on transitions in the written track at the bottom of each drawing.

DETAILED DESCRIPTION OF THE INVENTION

Figure 5B:
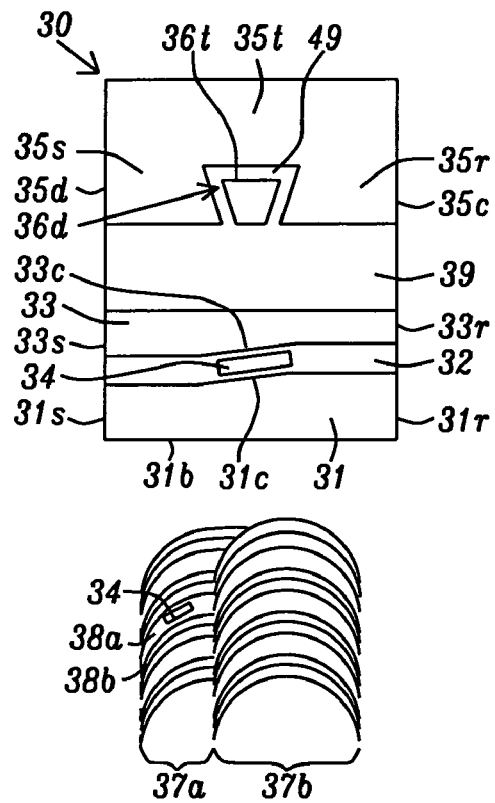

The present invention is a merged read/write structure for shingled writing wherein the reader may be designed to substantially reduce the relative skew between the reader and written tracks or the PMR writer may be designed to straighten the transition curvature at track edge. A reader is also known as a sensor by those skilled in the art. Although the exemplary embodiment depicts a PMR writer in a merged read/write head configuration, the present invention is not limited to a merged PMR read-write head and may encompass other PMR writer configurations as appreciated by those skilled in the art. In general, the bottom surface of a layer is defined as a side facing the substrate and top surface is a side facing away from the plane of a substrate. The term above is defined as a direction or location farther away from the substrate with respect to another layer. The present invention anticipates that the write pole may have one or both of a tapered leading edge and a tapered trailing edge.

Referring to FIG. 3, a conventional write pole 18 having a trapezoidal shape and with a leading edge 18a, sides 18s, and a trailing edge 18t is depicted. The sides are beveled at an angle β with respect to a plane 19-19 that intersects a corner of the trailing edge and is aligned perpendicular to a substrate (not shown). Therefore, the trailing edge 18t has a greater width c along the x-axis dimension than the width d of the leading edge 18a.

Referring to the top portion of FIG. 4a and FIG. 4b, a cross-sectional view from an air bearing surface (ABS) shows a prior art merged read/write head structure. The read head is comprised of a first (S1) shield 21, a gap layer 22 with a reader (sensor) 24 formed therein, a second (S1) shield 23, and a portion of the insulation layer 29 that typically includes a stack of dielectric layers (not shown). The write head is comprised of a portion of the insulation layer 29, a write pole 26 that has side shields 25s, a trailing shield 25t, and a trapezoidal shape. In one aspect, the S2 shield 23 may serve as a return pole in the write head. Alternatively, the return pole may be formed within insulation layer 29. A trailing side of the write pole 26 and a top surface of the reader 24 are parallel to each other and to the planes of the layers in the read/write structure. In a lower part of FIG. 4a, a reader 24 is superimposed over the center of a conventional written track to show there is no skew between the reader and a transition 28. The lower part of FIG. 4b shows shingled writing with a reader 24 superimposed over write track 27a that has been squeezed while writing track 27b. Note the reader is skewed with respect to the transitions in track 27a including transitions 28a, 28b.

Referring to FIG. 5a, one embodiment of the present invention is shown wherein a reader 34 is formed with a built in relative skew to a bottom surface 31b of the S1 shield 31 in order to reduce the relative skew between the reader and written tracks in shingled writing where the right corner 36c of write pole 36 is used for writing. The S1 shield 31 is formed on a substrate (not shown) that is part of a slider formed in an array of sliders on a wafer. After the read/write head 30 is completed, the wafer is sliced to form rows of sliders. Each row is typically lapped to afford an ABS before dicing to fabricate individual sliders that are used in a magnetic recording device.

S1 shield 31 has a first side 31s that is aligned with a side 35d of the side shield 35s in the write head and has a second side 31r which is aligned with a side 35c of side shield 35r along a z-axis (down track) direction. The top surface of S1 shield 31 facing reader 34 has a first section adjacent to side 31s and parallel to bottom surface 31b, and a second section adjacent to side 31r and parallel to bottom surface 31b. There is a center section 31c connecting first and second sections which is sloped with respect to bottom surface 31b and the substrate.

Above the S1 shield 31 is a gap layer 32 that may be a composite with a lower layer (not shown) contacting the S1 shield and an upper layer contacting the S2 shield 33. Within gap layer 32 is the reader 34 that is substantially parallel to sloped side 31c and therefore sloped with respect to bottom surface 31b. The slope angle (not shown) between the reader and a plane parallel to the bottom surface 31b and substrate is from 0 to 25 degrees and preferably between 5 and 10 degrees. The slope angle represents the amount of relative skew that will be used to compensate for the relative skew between reader and written tracks in conventional shingled writing. Preferably, reader 34 is formed between sloped section 31c and a parallel sloped section 33c on the bottom surface of S2 shield 33. Sloped section 33c connects a first section of the bottom surface of S2 shield 33 that is adjacent to side 33s and parallel to bottom surface 31b with a second section of bottom surface adjacent to side 33r and parallel to bottom surface 31b. Sloped sections 31c, 33c have a width along the ABS of 0.5 to 4 microns, and preferably between 1 to 2 microns. Side 33s aligns with side 31s and side 33r aligns with side 31r in a z-axis direction. In the exemplary embodiment, sides 31s, 33s represent the left side of the read head with respect to the down track direction at the ABS, and sides 31r, 33r represent the right side of the read head. Note that the thickness of side 33s is less than that of side 33r while side 31s has a greater thickness than side 31r. As a result, the top surface of S2 shield 33 that interfaces with insulation layer 39 is essentially parallel with bottom surface 31b.

In an alternative embodiment (not shown), the top surface of S1 shield 31 and bottom surface of S2 shield 33 have only two sections. As in the previous embodiment, S1 shield 31 has a top surface with a first section formed parallel to bottom surface 31b and adjacent to side 31s, and S2 shield 33 has a bottom surface with a first section formed parallel to bottom surface 31b and adjacent to side 33s. In this case, center sloped sections 31c, 33c extend to sides 31r, 33r, respectively, and there is no second flat section adjacent to sides 31r, 33r. As will be explained in a later section, the width of sloped center sections 31c, 33c is determined by several factors during an ion beam etch applied to S1 shield 31.

In the exemplary embodiment, the write pole 36 has a conventional trapezoidal shape and both leading edge 36a and trailing edge 36t are formed parallel to bottom surface 31b in the read head. Trailing shield 35t may be connected to side shields 35s, 35r. Furthermore, there may be a leading shield (not shown). Insulation layer 39 formed between S2 shield 33 and write pole 36 may include more than one dielectric layer. There is a write gap 49 that is essentially conformal to trailing edge 36t.

At the bottom of FIG. 5a, reader 34 is superimposed over a track 37a which was squeezed during shingled writing. Because of the sloped orientation of reader 34 with respect to bottom surface 31b, the reader essentially overlays on transition 38a which means substantially less skew between reader and written track than in the prior art. Similarly, the left corner writer in FIG. 5b shows sloped reader 34 superimposed on transition 38a with substantially less skew than previously observed in conventional readers. All layers illustrated in FIG. 5b are the same as in FIG. 5a except the reader is sloped toward a side of the read/write structure comprised of sides 31s, 33s, and side shield 35s. In this case, the thickness of S1 shield 31 is greater along side 31r compared to side 31s and the thickness of S2 shield 33 is greater along side 33s compared to side 33r.

Figure 6:
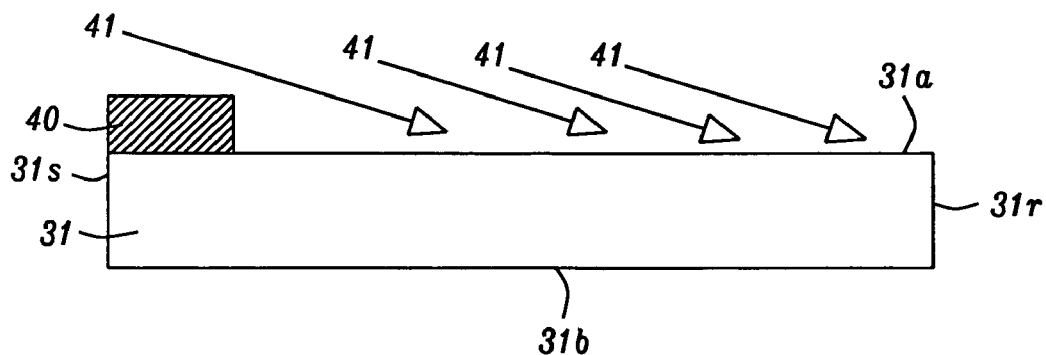
FIGS. 6-10 are cross-sectional views from an ABS that show the formation of a reader with built in relative skew according to an embodiment of the present invention.

Referring to FIG. 6, a first step in the method of forming a sloped reader 34 as described in the first embodiment of the present invention is depicted. S1 shield 31 is formed by sputter deposition or electroplating on a substrate (not shown) that may be a composite comprised of an upper insulation layer made of alumina or the like and a lower AlTiC layer. S1 shield 31 may be comprised of NiFe, for example, and has a top surface 31a formed parallel to the bottom surface 31b. Sides 31r, 31s are aligned perpendicular to bottom surface 31b. A photoresist layer is patterned to form a mask 40 on an end section of top surface 31a proximate to side 31s. Then a shallow angle IBE process is performed such that ions are directed toward top surface 31a in a unidirectional manner as indicated by arrows 41. The step to form a slope on the top surface of the S1 shield is the only additional step required to fabricate a reader 34 with a built in slope. Otherwise, all of the other processes mentioned with regard to FIGS. 7-10 are performed in a conventional process flow for making a read head.

In an alternative embodiment that is not shown, the sloped surface 31c may be created by first ion milling at a shallow angle into the substrate followed by sputtering the S1 shield 31 on the sloped substrate. In this case, the bottom surface 31b would be sloped and essentially parallel to the sloped section of S1 shield 31.

Figure 7:
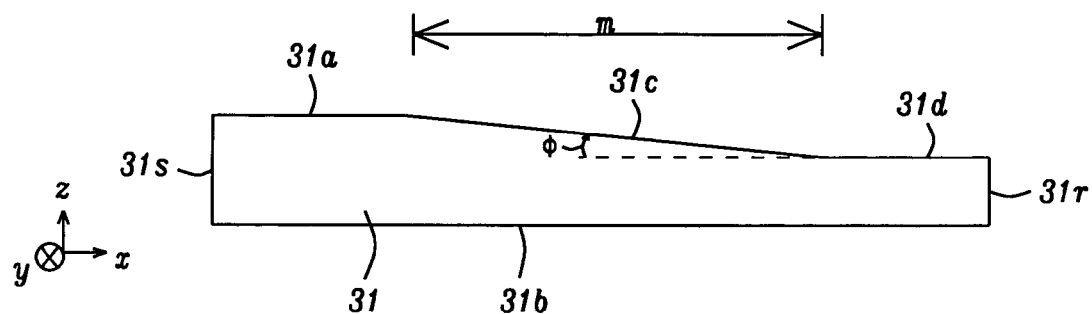

Referring to FIG. 7, the width m of the sloped center section is determined by several factors including the thickness of the photoresist mask 40, the angle of the IBE etch, and duration of the IBE etch. After the IBE step is completed in the exemplary embodiment, photoresist mask 40 is removed to leave a top surface comprised of one end section 31a with its original thickness and formed parallel to bottom surface 31b, a sloped middle section 31c, and a second end section 31d proximate to side 31r and parallel to bottom surface 31b. Sloped section 31c has a width m along the ABS of 0.5 to 4 microns, and preferably 1 to 2 microns, and is formed at an angle $\phi$ between 0 and 25 degrees, and preferably, from 5 to 10 degrees with respect to end section 31d (and the substrate). Side 31s has a greater thickness in the z-axis direction than side 31r.

Figure 8:
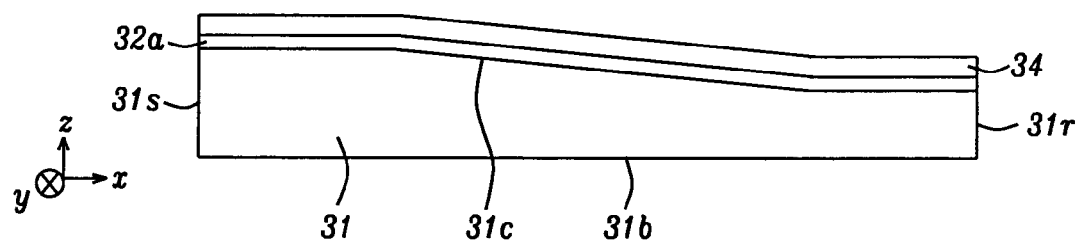

Referring to FIG. 8, a gap layer 32a made of dielectric material is preferably laid down in a conformal manner on S1 shield 31 by a PVD or CVD process, for example. Thereafter, the stack of layers (not shown) included in reader 34 is deposited on gap layer 32a. The reader stack preferably conforms to gap layer 32a so that the slope having angle $\phi$ in S1 shield 31 is retained in reader 34.

Figure 9:
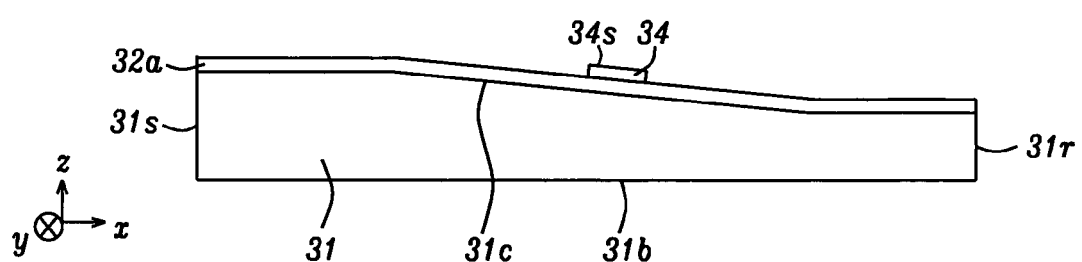

Referring to FIG. 9, a conventional photoresist patterning and etching sequence is employed to form sloped reader 34 with a top surface 34s that is parallel to sloped center section 31c. Gap layer 32a remains on S1 shield 31 and has a top surface 32s that is exposed in regions not covered by sloped reader 34.

Figure 10:
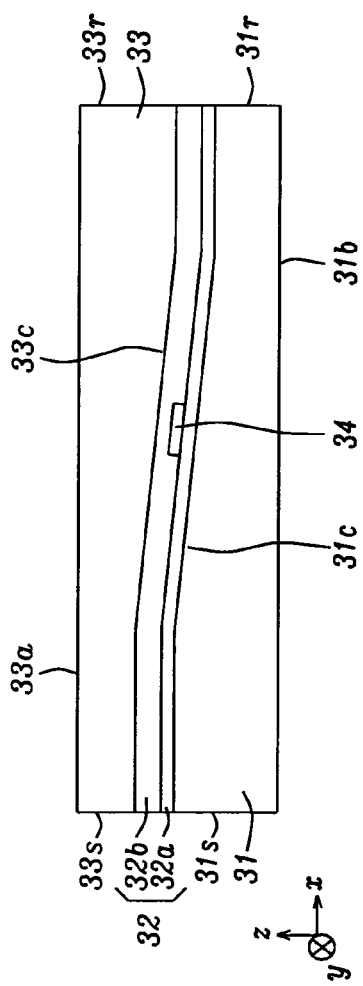

Referring to FIG. 10, a gap layer 32b (not shown) is deposited on gap layer 32a and on sloped reader 34 to form a composite where bottom and top portions are typically made of the same dielectric material and thereby designated as gap layer 32. Gap layer 32 is preferably conformal to S1 shield 31. Next, S2 shield 33 which may be comprised of the same magnetic material as in S1 shield 31 is deposited by a sputter deposition or plating method, for example, on gap layer 32. A CMP process may be used to form a planar top surface 33a that is parallel to bottom surface 31b. As a result, sloped reader 34 is formed parallel to center sections 31c, 33c.

Returning to FIG. 5a, in a following sequence of steps, insulation layer 39 is deposited on S2 shield 33 and the write head 36, side shields 35s, 35r, and trailing shield 35t are formed by well known methods. It should be understood that the write pole represents an extension of the main pole layer (not shown) which extends from the ABS to a back end of the device. There are additional layers above the trailing shield 35t in the write head which are not shown in order to simplify the drawing. Also, there are other layers such as the coil layer and a back gap region formed within the insulation layer 39 that are not shown since they are not required to illustrate the inventive nature of the present invention.

Figure 11:
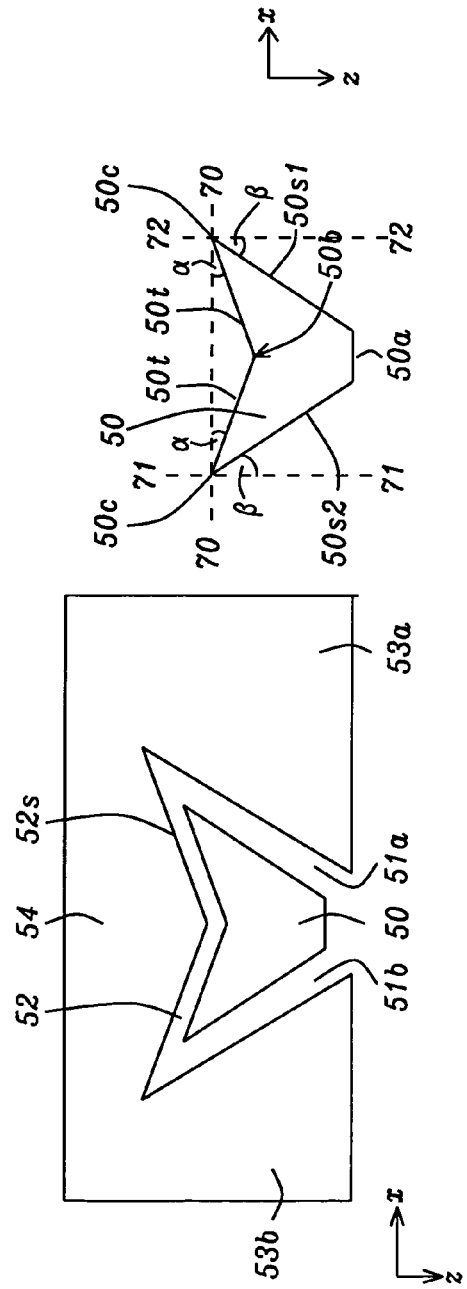
FIG. 11 is a cross-sectional view from an ABS of a symmetrical write pole with a sloped trailing edge, side shield, and trailing shield according to an embodiment of the present invention.

The present invention also encompasses embodiments in which the write pole has a special design to minimize transition curvature and enable less skew between reader and written tracks in shingled writing. Referring to FIG. 11, a first embodiment is illustrated with a write pole 50 having a leading edge 50a formed along an x-axis direction that is perpendicular to a down track or z-axis direction. Two sloped sides 50s1, 50s2 are formed with a bevel angle β with respect to a plane 72-72 and a plane 71-71, respectively, that are parallel to the z-axis and intersect a corner 50c of the write pole. Bevel angle β is from 5 to 45 degrees and preferably between 20 and 35 degrees which is larger than bevel angles in conventional write poles that are typically less than 10 degrees. A key feature is that the trailing edge 50t is not a straight line but is bowed towards the leading edge 50a and has a greater width along the ABS than the leading edge. In one aspect, there are essentially two equal length sections of trailing edge 50t that intersect at a point 50b midway between planes 71-71 and 72-72 and each section forms an angle α with respect to a plane 70-70 which includes the two corners 50c of trailing edge 50t. A corner 50c is defined as a location where a side 50s1 or 50s2 meets trailing edge 50t. Thus, point 50b at the center of trailing edge 50t has a lower pole height than corners 50c which have the largest pole height of any location on the trailing edge. Angle α is from 5 to 45 degrees and preferably is between 10 and 30 degrees.

The present invention also anticipates alternative embodiments (not shown) wherein the trailing edge 50t is bowed towards the leading edge, forms a continuous line between the two corners 50c, and is formed as a curve or in a plurality of segments. For example, a flat segment (not shown) that includes mid point 50b may be formed between the two sloped segments and parallel to leading edge 50a to provide a trailing edge that has a total of three segments.

On the left side of FIG. 11, write pole 50 is shown with a first side gap 51a adjacent to first write pole side 50s1 and a second side gap 51b adjacent to second write pole side 50s1. Preferably, first side gap 51a and adjacent first side shield 53a are substantially conformal to the first write pole side 50s1. Similarly, second side gap 51b and adjacent second side shield 53b are substantially conformal to a second write pole side 50s2. Write gap 52 is formed between trailing edge 50t and trailing shield 54. Preferably, write gap 52 and trailing shield 54 are substantially conformal to the trailing edge. According to one embodiment, side shields 53a, 53b are magnetically connected to trailing shield 54. It should be understood that either corner 50c in write pole 50 may be used for shingled writing. For example, the right corner 50c where planes 70-70 and 72-72 intersect may be used for right to left (OD to ID) shingled writing, and the left corner 50c where planes 70-70 and 71-71 intersect may be used for left to right (e.g. ID to OD) shingled writing.

Figure 12:
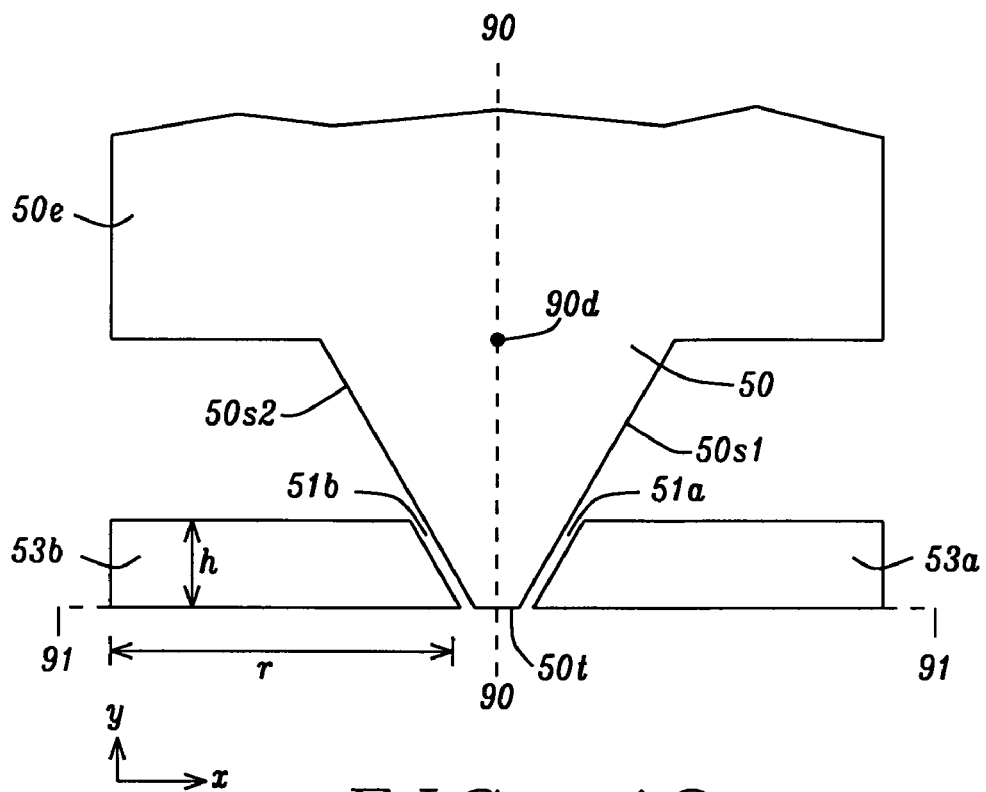
FIG. 12 is a top-down view of the main pole and side shields in FIG. 11 with top-shield removed.

Referring to FIG. 12, the main pole 50 is depicted from a top-down view with the trailing shield removed to show the location of side shields 53a, 53b relative to the write pole trailing edge 50t at the ABS 91-91. In this embodiment, the main pole has zero neck height and the side gaps 51a, 51b and side shields 53a, 53b are substantially conformal with the nearest side 50s1, 50s2, respectively, of the main pole. Sides 50s1, 50s2 are tapered and flare outward with respect to a center plane 90-90 such that the distance between a side and the center plane becomes greater with increasing distance from the ABS 91-91. Each side shield 53a, 53b extends a distance r along the ABS from the side gap 51a, 53a, respectively, and extends a distance h from the ABS in a direction parallel to center plane 90-90 and toward the back end 50e of the main pole. In an alternative embodiment (not shown), the main pole has a certain neck height wherein the sides 50s1, 50s2 extend in a direction perpendicular to the ABS for a certain distance before flaring outward with respect to the center plane 90-90. The slope in trailing edge 50t may extend along a top surface of the main pole in the flared portion between sides 50s1, 50s2 and terminate on or before point 90d on plane 90-90. In another embodiment, the slope in trailing edge 50t may continue beyond point 90d and into the back end 50e of the main pole.

Figure 13:
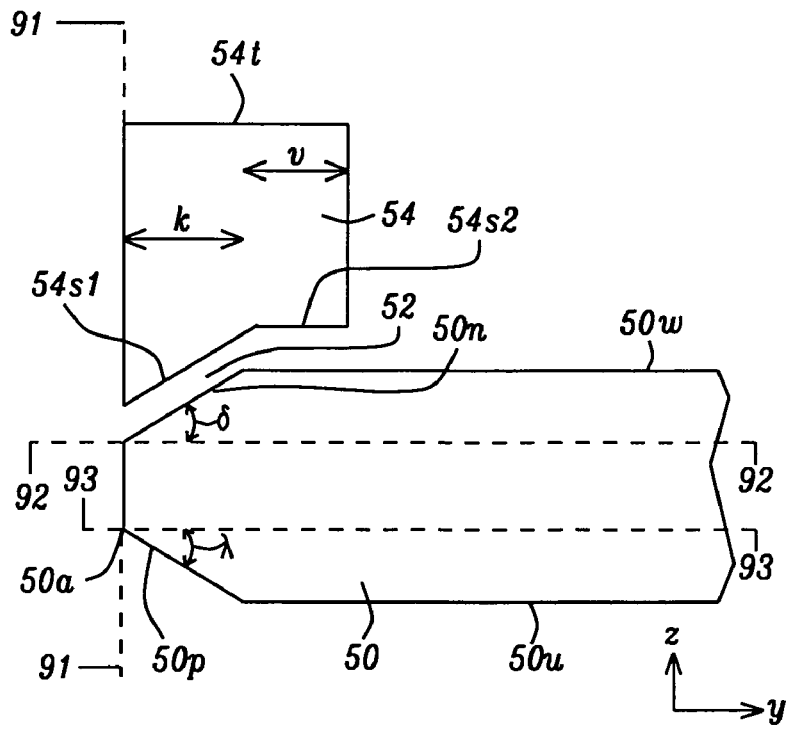
FIG. 13 is a cross-sectional view showing a tapered main pole at the ABS and a tapered trailing shield according to an embodiment of the present invention.

Referring to FIG. 13, a cross-sectional view along plane 90-90 through the main pole in FIG. 12 is illustrated. In this drawing, the trailing shield 54 is included and is separated from main pole 50 by write gap 52 which is substantially conformal to a side 50n that includes trailing edge 50t and extends a distance k from the ABS 91-91. In the exemplary embodiment, trailing shield 54 has a side facing the main pole 50 comprised of a first section 54s1 that extends a distance k from the ABS and is formed parallel to side 50n. Section 54s1 connects with a second section 54s2 that is parallel to a top surface 50w of the main pole layer and extends an additional distance v beyond the end of section 54s1 from the ABS 91-91. The trailing shield also has a side 54t formed parallel to section 54s2 and extending a distance of k+v from the ABS. Side 50n forms an angle δ with respect to a plane 92-92 that is perpendicular to the ABS and includes trailing edge 50t. There is also a side 50p of the main pole which includes leading edge 50a and extends a certain distance toward the back end of main pole 50. Side 50p forms an angle λ with respect to a plane 93-93 that is perpendicular to the ABS and includes leading edge 50a. In other words, leading edge 50a may be part of a tapered side 50p that extends from the ABS to a bottom surface 50u. Furthermore, trailing edge 50t may be part of a tapered side 50n that extends from the ABS to a top surface 50w where both surfaces 50u, 50w are essentially perpendicular to ABS 91-91.

Figure 14:
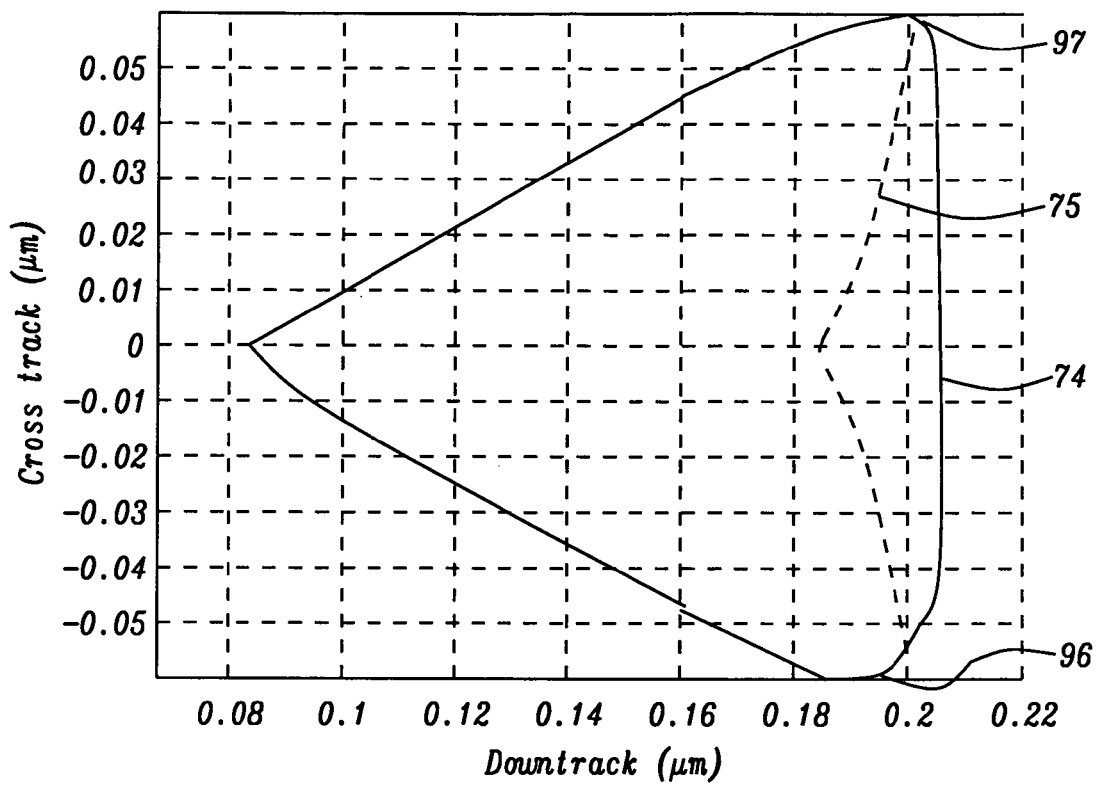
FIG. 14 is a field contour plot of a prior art write pole with a flat trailing edge and for a write pole as depicted in FIG. 11 where the trailing edge has an angle of 20 degrees with respect to a plane that is parallel to the write pole leading edge.

Referring to FIG. 14, a field contour 74 of Hy=5000 Oe is shown for a prior art write pole having a flat trailing edge that is in a typical trapezoid shape. Field contour 75 of Hy=5000 Oe is for a write pole shape with a bowed trailing edge (angle α=20 degrees) according to an embodiment depicted in FIG. 11. There is practically no difference in profile in a down track or cross track direction compared to a prior art write pole. Thus, the modified write head described herein may be implemented without sacrificing any writing capability.

Figure 15:
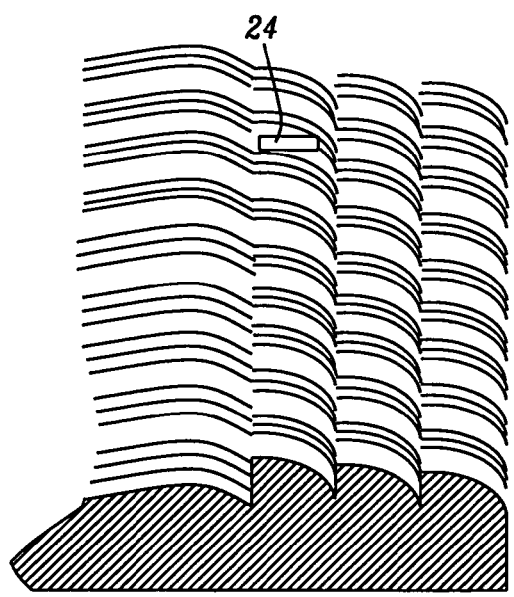
FIGS. 15 and 16 are respectively the simulated written transitions using the field contours in FIG. 14 for the prior art write pole, and the write pole according to the present invention where the trailing edge angle is 20 degrees.
Figure 16:
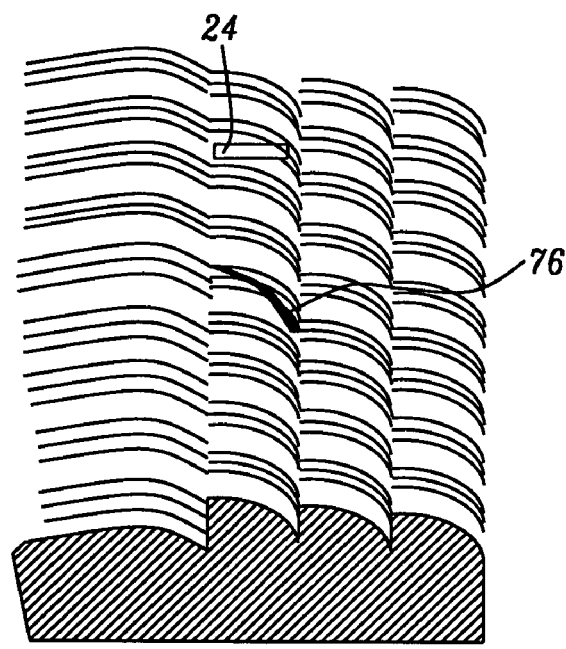

In FIG. 15, a reader 24 is overlaid on simulated written transitions generated from the field contour in FIG. 14 (curve 74) for a write pole according to a prior art design. Note that the transition curvature is not aligned with the reader. However, in FIG. 16, the transition curvature has been substantially adjusted after producing the transitions according to the field contour (curve 75) in FIG. 14. In this case, transition curvature with respect to a conventional reader 24 is significantly reduced. These are not micromagnetic results but a shift of the contour lines to obtain the transitions which is believed to be fair for a transition curvature comparison on an average basis. Curved line 76 shows the curvature in FIG. 15 overlaid on a plurality of transitions in a squeezed track in FIG. 16. It is believed that the transition curvature is directly related to the rounding at corner 96 in right corner writing and at corner 97 in left corner writing (FIG. 14). Thus, the additional bending shown at corners 96, 97 in field contour 75 is responsible for straightening the transition in written tracks in shingled writing according to embodiments of the present invention. Similarly, asymmetrical writers described in subsequent embodiments will show a bending at a write corner of a field contour that leads to a straightening of transitions in written tracks.

Figure 17:
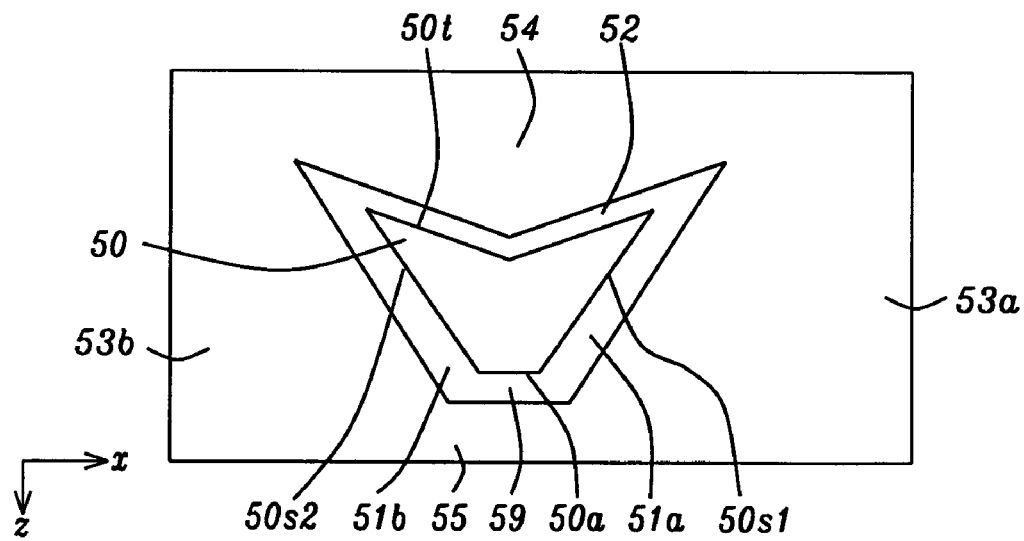
FIG. 17 is a cross-sectional view representing a modification of the invention shown in FIG. 11 where a leading shield is added to provide a full wrap around shield structure.

In an alternative embodiment depicted in FIG. 17, the modified write pole described with regard to FIG. 11 may be further comprised of a leading shield 55 in a down track (z-direction) from leading edge 50a of write pole 50 and separated from the leading edge by a leading gap 59 that is comprised of a non-magnetic material. Moreover, leading shield 55 may be magnetically connected to side shields 53a, 53b to provide a wrap around shield structure that also includes trailing shield 54 at the ABS. In addition, leading gap 59 may be connected to side gaps 51a, 51b.

Figure 18:
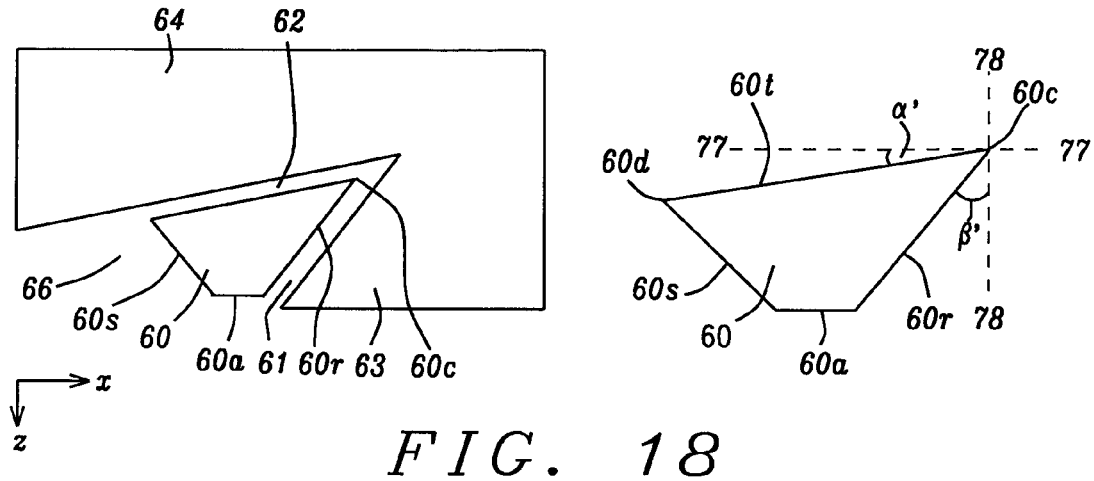
FIG. 18 is a cross-sectional view from an ABS of an asymmetrical write pole with a single side shield for right corner shingled writing according to an embodiment of the present invention where the trailing edge is sloped and a first side including the write corner is longer than a second side of the write pole.

The present invention also includes embodiments wherein an asymmetrical write pole is employed to provide straighter transitions and reduced skew between written transitions and a reader. Referring to FIG. 18, an asymmetrical write pole 60 for right corner writing is illustrated on the right side of the drawing and has a leading edge 60a that is formed parallel to the x-axis direction and perpendicular to the z-axis or down track direction. The two sides 60s and 60r are of unequal length. Side 60r connects leading edge 60a to the write corner 60c on trailing edge 60t and is longer than side 60s connecting leading edge 60a to a corner 60d on the trailing edge. As a result, the write corner 60c has the largest pole height on the trailing edge 60t and the opposite corner 60d has the lowest pole height. Trailing edge 60t is a straight line but forms an angle α' with respect to a plane 77-77 that is parallel to leading edge 60a. Plane 77-77 is perpendicular to plane 78-78 and both of the aforementioned planes intersect at write corner 60c. Angle α' is from 5 to 45 degrees and preferably is between 10 and 30 degrees.

On the left side of FIG. 18, write pole 60 is shown with a side shield 63 that is separated from side 60r by a side gap 61. Side shield 63 is connected to a trailing shield 64 which is separated from trailing edge 60t by a write gap 62 that is substantially conformal to the trailing edge. There is no side shield proximate to short side 60s in this embodiment. A non-magnetic layer 66 is formed adjacent to side 60s and is typically made of a dielectric material. Note that side gap 61 is substantially conformal to side 60r and connects with write gap 62 proximate to write corner 60c. In this case, the write head is used for right-to-left shingled writing (e.g. OD to ID).

In one aspect, the main pole may have a zero neck height and there may be tapering on the leading edge and trailing edge similar to that shown for the symmetrical write pole in FIG. 13. Furthermore, sides 60r, 60s may be flared or tapered from a top view (not shown) similar to sides 50s1, 50s2 in FIG. 12. In other words, the distance between sides 60r, 60s becomes greater with increasing distance from the ABS.

Figure 19:
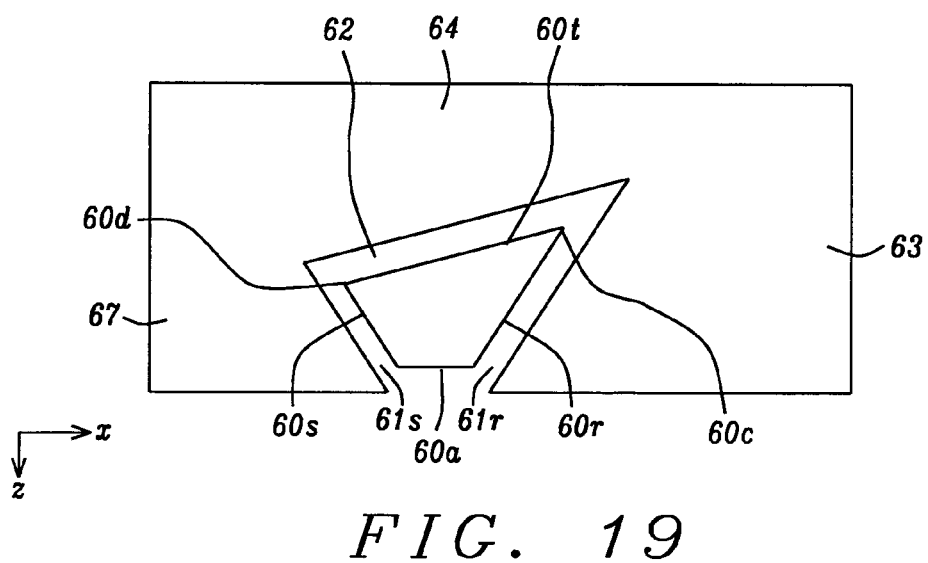
FIG. 19 is a cross-sectional view representing a modification of the invention shown in FIG. 18 where a second side shield is added proximate to the shorter side.

In an alternative embodiment in FIG. 19, the shield structure formed adjacent to asymmetrical write pole 60 at the ABS may be further comprised of a second side shield 67 proximate to short side 60s. Note that the gap between side shield 63 and side 60r is now designated as side gap 61r. Side gap 61s separates second side shield 67 from side 60s (short side) and is substantially conformal to the short side. Side shield 63 and side shield 67 may be magnetically connected to trailing shield 64 to form a shield structure surrounding write pole 60 on three sides at the ABS.

Figure 20:
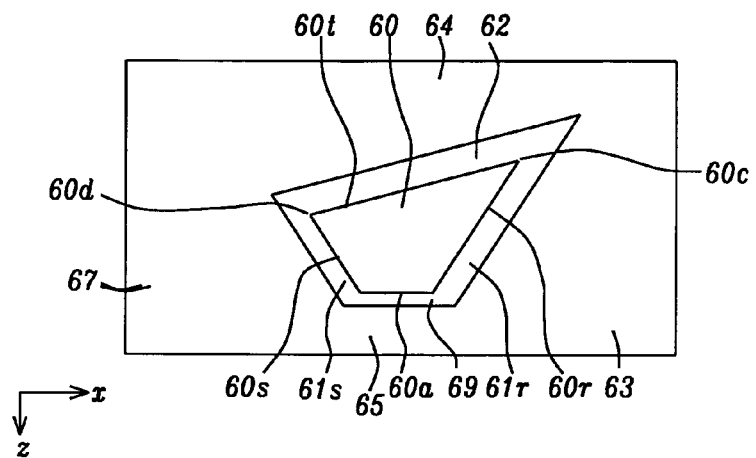
FIG. 20 is a cross-sectional view representing a modification of the invention shown in FIG. 19 where a leading shield is added to provide a full wrap around shield structure.

In yet another embodiment depicted in FIG. 20, the shield structure shown in FIG. 19 may be further comprised of a leading shield 65 that is connected to side shields 63, 67 and thereby forms a shield structure completely surrounding write pole 60 at the ABS. Leading edge 60a is separated from leading shield 65 by a leading gap layer 69.

Figure 21:
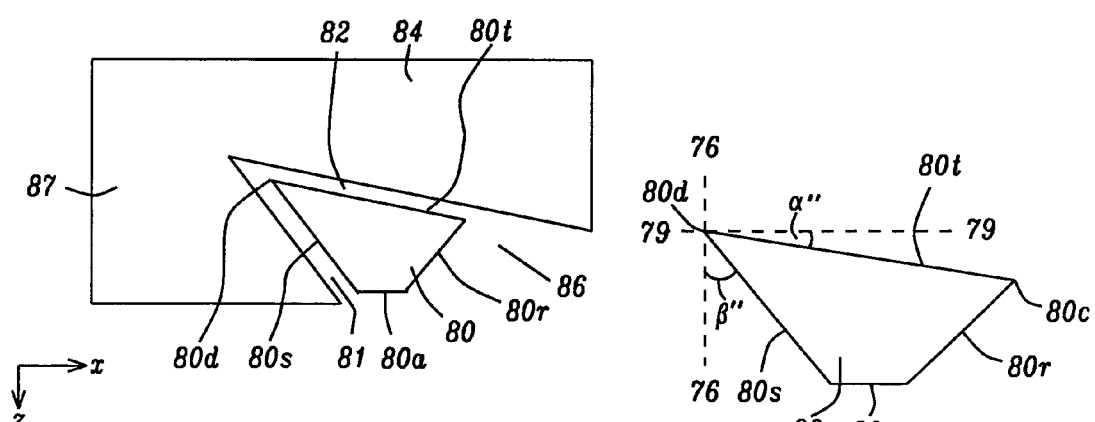
FIG. 21 is a cross-sectional view from an ABS of an asymmetrical write pole with a single side shield for left corner shingled writing according to an embodiment of the present invention where the trailing edge is sloped and a second side including the write corner is longer than a first side of the write pole.

Another embodiment involving an asymmetric write pole is shown in FIG. 21 and relates to left corner writing. As illustrated on the right side of the drawing, write pole 80 has a leading edge 80a that is formed parallel to the x-axis direction and perpendicular to the z-axis or down track direction. The two sides 80s and 80r are of unequal length. Side 80s connects leading edge 80a to the write corner 80d on trailing edge 80t and is longer than side 80r connecting leading edge 80a to a corner 80c on the trailing edge. Trailing edge is a straight line but has an angle α" with respect to a plane 79-79 that is parallel to leading edge 80a. Plane 79-79 is perpendicular to plane 76-76 and both of the aforementioned planes intersect at write corner 80d. Angle α" is from 5 to 45 degrees and preferably is between 10 and 30 degrees.

On the left side of FIG. 21, write pole 80 has a side shield 87 that is separated from side 80s by a side gap 81 which is substantially conformal to side 80s. Side shield 87 is connected to a trailing shield 84 that is separated from trailing edge 80t by a write gap 82 which is substantially conformal to the trailing edge. There is no side shield proximate to short side 80r in this embodiment. Non-magnetic layer 86 is formed adjacent to side 80r and is preferably made of a dielectric material. Side gap 81 connects with write gap 82 proximate to write corner 80d. In this case, the write head is used for left-to-right shingled writing (e.g. ID to OD).

Figure 22:
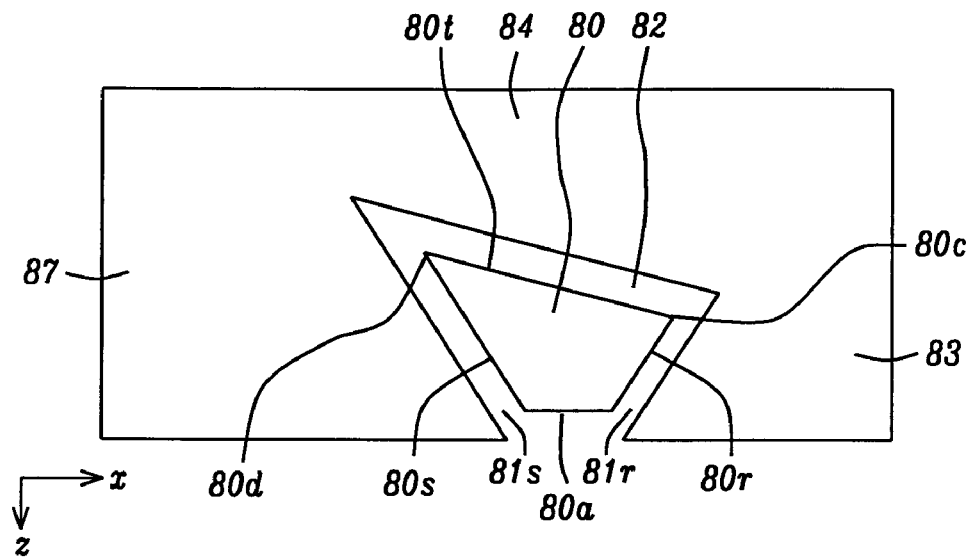
FIG. 22 is a cross-sectional view representing a modification of the invention shown in FIG. 21 where a second side shield is added proximate to the shorter side.

In an alternative embodiment in FIG. 22, the shield structure formed adjacent to asymmetrical write pole 80 at the ABS may be further comprised of a second side shield 83 proximate to short side 80r. Note that the side gap between side shield 87 and side 80s is now designated as side gap 81s. Write gap 81r separates second side shield 83 from side 80r and is substantially conformal to the short side. Side shield 83 and side shield 87 may be connected to trailing shield 84 to form a shield structure surrounding write pole 80 on three sides at the ABS.

Figure 23:
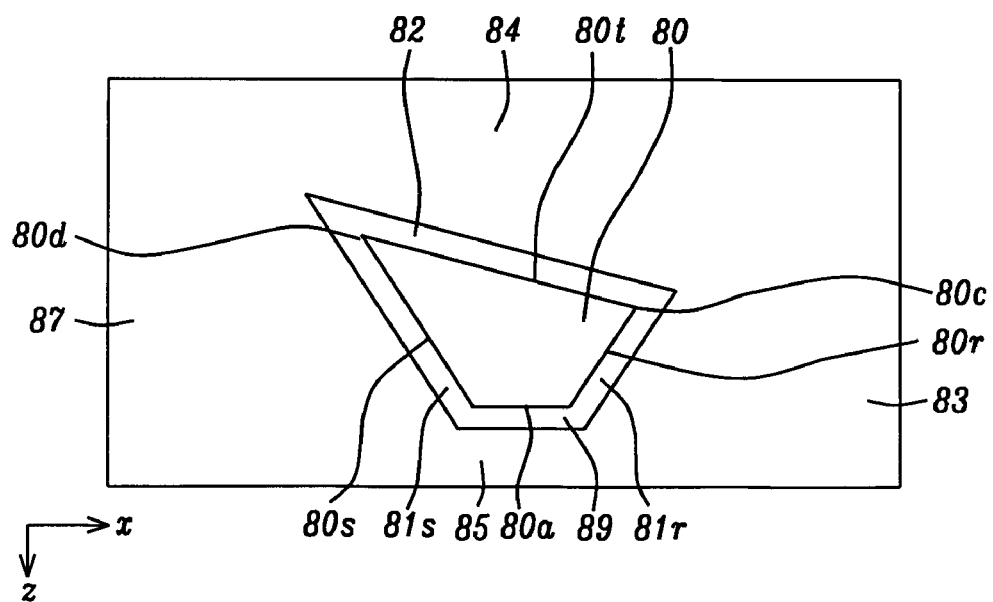
FIG. 23 is a cross-sectional view representing a modification of the invention shown in FIG. 21 where a leading shield is added to provide a full wrap around shield structure.

In yet another embodiment depicted in FIG. 23, the shield structure shown in FIG. 22 may be further comprised of a leading shield 85 that is connected to side shields 83, 87 and thereby forms a shield structure completely surrounding write pole 80 at the ABS. Leading edge 80a is separated from leading shield 85 by a leading gap layer 89.

Figure 24:
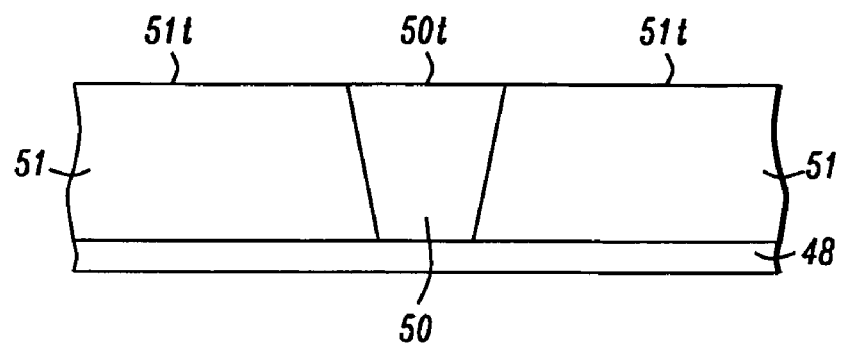
FIGS. 24-26 and FIGS. 27-29 are cross-sectional views depicting a method of making symmetrical and asymmetrical write poles in FIG. 11 and FIG. 18, respectively.

Referring to FIG. 24, a first step in the formation of a symmetrical write pole with a bowed trailing edge according to the embodiments described with respect to FIG. 11 and FIG. 17 is shown. A write pole 50 having a trapezoid shape may be formed by a conventional method within a dielectric layer 51 on a substrate 48 such as AlTiC, for example. A RIE resistant layer or etch stop (not shown) such as Ru or NiCr may be formed on the substrate 48 before the dielectric layer 50 is deposited. A top surface 51t of dielectric layer 51 is preferably coplanar with the trailing edge 50t of write pole 50.

Figure 25:
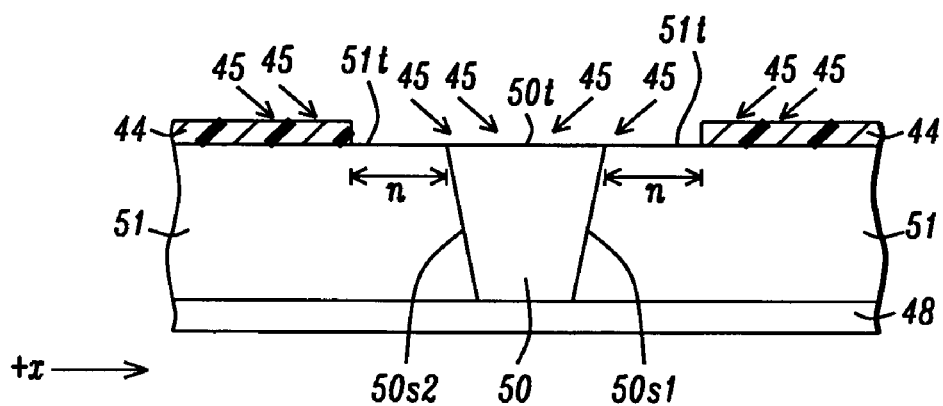

Referring to FIG. 25, a photoresist mask 44 is formed on top surface 51t except for a region of width n adjacent to write pole trailing edge 50t. An IBE process is performed at a shallow angle as indicated by arrows 45 such that the ions are directed towards a center of top surface 50t from both directions along the x-axis. In one aspect, the wafer is rotated to achieve a sweeping motion of ion impingement on the top surface 51t as illustrated in the exemplary embodiment. In an alternative embodiment (not shown), a first IBE process is performed with ions directed at a static angle from left to right in a (+) x-axis direction across first photoresist mask that is only formed on dielectric layer proximate to side 50s1. Then, the first photoresist mask is removed and a second photoresist mask (not shown) is formed on dielectric layer 51 but only on a portion of top surface 51t proximate to side 50s2. Subsequently, a second IBE process is performed with ions directed at a static angle from right to left in a (−) x-axis direction. Thereafter the second photoresist mask is stripped.

Figure 26:
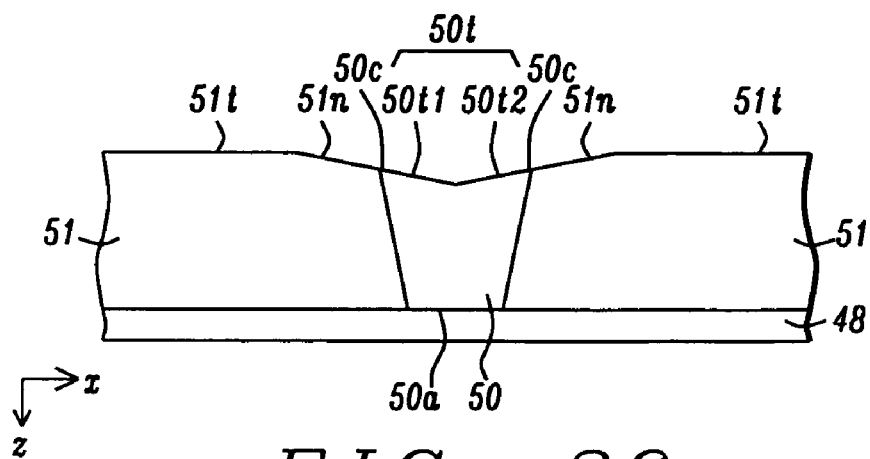

After the IBE process is completed in the exemplary embodiment, photoresist mask 44 is removed by a conventional method to give a trailing edge 50t that is bowed towards the substrate 48 and leading edge 50a as illustrated in FIG. 26. Moreover, the top surface 51n adjacent to write pole 50 may be sloped such that top surface sections 51n have a lesser thickness in a z-axis direction than portions 51t which were protected during the IBE step. Since there is some variability in the IBE process, a first section 50t1 of top surface 50t does not necessarily have the same length as a second section 50t2. As indicated previously, trailing edge 50t may have other shapes such as a curved line or a plurality of segments forming a continuous line between corners 50c.

Figure 27:
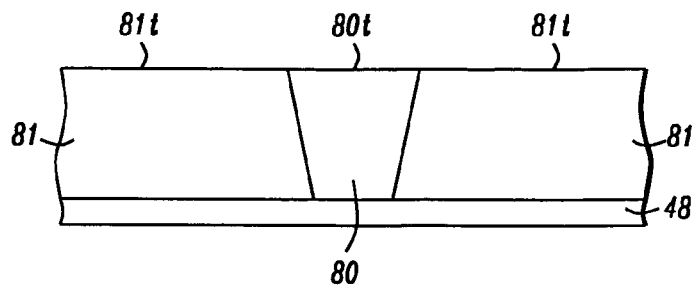

Referring to FIG. 27, a first step in the formation of an asymmetrical write pole with a straight trailing edge according to the embodiment described with respect to FIG. 18 is shown. A write pole 80 having a trapezoid shape may be formed by a conventional method within a dielectric layer 81 on a substrate 48. A RIE resistant layer or etch stop (not shown) such as Ru or NiCr may formed on the substrate 48 before the dielectric layer 80 is deposited. A top surface 81t of dielectric layer 81 is preferably coplanar with the trailing edge 80t of write pole 80.

Figure 28:
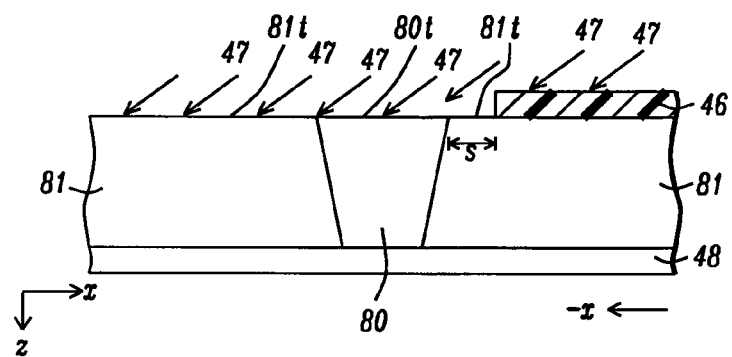

Referring to FIG. 28, a photoresist mask 46 is formed on top surface 81t on one side of write pole 80 except for a region of width s adjacent to write pole trailing edge 80t. An IBE process is performed at a shallow angle as indicated by arrows 47 such that the ions are directed towards the trailing edge 80t and unprotected regions of top surface 81t in only a (−) x-axis direction.

Figure 29:
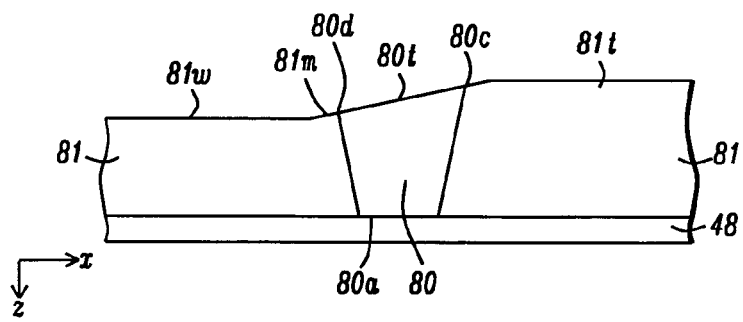

After the IBE process is completed, the photoresist mask 46 is stripped by a conventional method to give a trailing edge 80t that is sloped towards the substrate 48 and leading edge 80a as illustrated in FIG. 29. Note that corner 80d is a lesser distance from substrate 48 and leading edge 80a than write corner 80c. Moreover, the top surface 81n adjacent to write corner 80c may be sloped such that a portion contacting write pole 80 has a lesser thickness in a z-axis direction than portions 81t which were protected during the IBE step. In addition, a top surface 81m adjacent to corner 80d may be sloped and have a greater thickness in the z-axis direction than a top surface 81w that is on a side of write pole which was unprotected during the IBE step.

It should be understood that fabrication of a left corner writer as depicted in FIG. 21 may be accomplished with the same series of steps as depicted in FIGS. 27-29 except the IBE process involves ions directed at a shallow angle in the (+) x-axis direction and a photoresist mask formed on top surface 81t to the left of write pole 80.

Subsequent steps after the formation of a sloped top surface 50t (FIG. 26) or formation of a sloped top surface 80t (FIG. 29) may involve removal of the dielectric layer 51 (or 81), formation of side gaps adjacent to the write pole, and then formation of the side shield and trailing shield structure.

Figure 30:
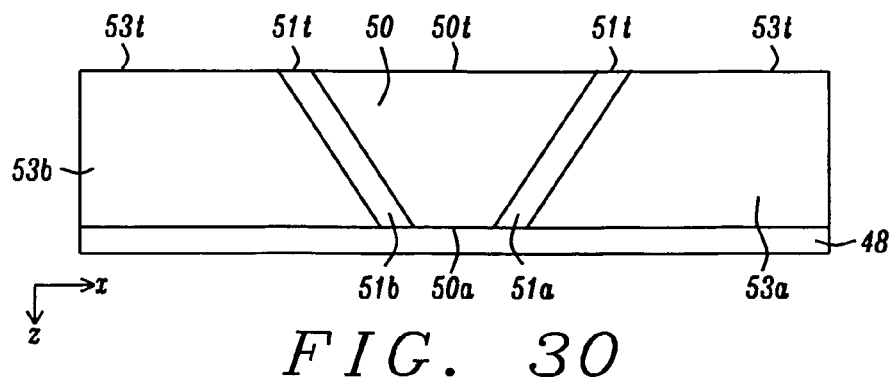
FIG. 30 depicts an intermediate step in the fabrication of a symmetrical writer with a sloped trailing edge according to one embodiment of the present invention.

Referring to FIG. 30, the present invention also encompasses a method of forming a symmetrical writer with a sloped trailing edge wherein the IBE process to define a slope in the trailing edge of the write pole is defined after the side shields and side gaps are already formed. In this case, the partially formed write head having a trailing edge that is parallel to substrate 48 and coplanar with top surfaces 51t of side gaps 51a, 51b and with top surfaces 53t of side shields 53a, 53b is formed by a well known process. Then the IBE process previously described with regard to FIG. 25 is performed to define a trailing edge 51t that is bowed toward substrate 48 and leading edge 50a.

It should be understood that an asymmetrical writer may also be formed according to an embodiment (not shown) which is similar to the process outlined with regard to FIG. 30. In other words, the same partially formed write head depicted in FIG. 30 may be the point at which an IBE process as described with respect to FIG. 28 is performed. Thus, an IBE process may be performed to define a sloped trailing edge on a write pole that has adjacent side gaps and side shields. Thereafter, a write gap and write shield may be sequentially formed on the sloped trailing edge by a conventional method.

In summary, the write pole designs as described herein provide an advantage over conventional write heads in that straighter transitions in the written track are achieved as well as a reduced skew between reader and the transitions to provide higher signal to noise ratio (SNR) for shingled writing at high linear densities. Furthermore, the reader may be formed at a slope with respect to a substrate and write pole to reduce the skew in shingled writing at zero head skew with minimum process changes.

While this invention has been particularly shown and described with reference to, the preferred embodiment thereof, it will be understood by those skilled in the art that various changes in form and details may be made without departing from the spirit and scope of this invention.

We claim:

1. A read/write head structure for shingled writing, comprising:
(a) a read head formed on a substrate, said read head comprises:
(1) a S1 shield that has a lower surface formed on said substrate, first and second sides formed perpendicular to the substrate, and a top surface with a center section that is sloped with respect to said bottom surface such that a first end of the center section proximate to said first side is a greater distance from the substrate than a second end proximate to the second side;
(2) a S2 shield with a top surface that is parallel to said substrate, a first side aligned with the first side of the S1 shield, a second side aligned with the second side of the S1 shield, and a bottom surface that contacts a top surface of a gap layer, said bottom surface has a center section that is sloped and essentially parallel with the S1 shield center section;
(3) the gap layer which separates said S1 shield from said S2 shield; and
(4) a reader formed along an ABS, within the gap layer, and between the center sections of the S1 and S2 shields, and having a top surface and bottom surface that are essentially planar with the center sections of the S1 and S2 shields; and
(b) a write head comprising:
(1) a write pole formed along the ABS with a leading edge and trailing edge parallel to the substrate, and two sides wherein each side intersects the trailing edge at a corner;
(2) a write gap formed along a plane that is essentially parallel to the substrate;
(3) a side shield formed along the two sides of the write pole and separated from the write pole by a side gap; said side shield has a first side aligned with the first side of the S1 shield and a second side aligned with the second side of the S1 shield; and
(4) a trailing shield that is connected to the side shield and separated from the trailing edge by the write gap.

2. The read/write structure of claim 1 wherein the reader is formed at an angle of 0 to about 25 degrees with respect to the substrate.

3. The read/write structure of claim 1 wherein the center section of the S1 shield top surface and the center section of the S2 shield bottom surface have a width along the ABS between about 0.5 to 4 microns.

4. The read/write structure of claim 1 wherein the first side of the S1 and S2 shields represent the left side of the read head with respect to a down-track direction along the ABS, the second side represents the right side of the read head, and a corner of the trailing edge proximate to the second side of the side shield is the write corner for shingled writing.

5. A method of forming a read/write head structure to reduce skew between a reader and written tracks in shingled writing, comprising:
   (a) providing a substrate with a first (S1) shield having a top surface formed thereon;
   (b) performing a shallow angle ion beam etch to form a sloped center section in said top surface;
   (c) forming a gap layer on the top surface of the S1 shield and a reader within the gap layer such that said reader is aligned parallel to the sloped center section of the S1 shield;
   (d) forming a S2 shield with a bottom surface that contacts a top surface of the gap layer, said bottom surface has a sloped center section parallel to the sloped center section of the S1 shield and said reader is positioned between the sloped center sections of the S1 and S2 shields;
   (e) forming an insulation layer on a top surface of the S2 shield; and
   (f) forming a write head on the insulation layer wherein said write head includes a write pole with a trailing edge, a write gap that is aligned parallel to said substrate, and a shield structure that includes at least a trailing shield and a side shield, said side shield has a first side aligned with a first side of the S1 and S2 shields and a second side aligned with a second side of the S1 and S2 shields.

6. The method of claim 5 wherein the reader is formed at an angle of 0 to about 25 degrees with respect to the substrate.

7. The method of claim 5 wherein the center section of the S1 shield top surface and the center section of the S2 shield bottom surface have a width along the ABS between about 0.5 to 4 microns.

8. The method of claim 5 wherein a first end of the reader formed proximate to the first side of the S1 and S2 shields is a greater distance from the substrate than a second end formed proximate to the second side of the S1 and S2 shields, and said trailing edge of the write pole has a write corner closer to the second side of the side shield than the first side of the side shield.

9. A PMR write head for shingled writing, comprising:
   (a) a write pole having a leading edge formed parallel to a substrate along the ABS, two sides that form an angle $\beta$ with respect to a first plane that is perpendicular to the substrate, and a trailing edge that intersects the two sides at two corners, said trailing edge has a greater width along the ABS than the leading edge; forms an angle $\alpha$ at each corner with respect to a second plane that is parallel to the leading edge and includes the two corners, and is bowed towards the leading edge such that a center point on the trailing edge has a smaller pole height than the corners;
   (b) a first side gap formed adjacent to a first write pole side, a second side gap formed adjacent to a second write pole side, and a write gap formed adjacent to the trailing edge; and
   (c) a shield structure including a trailing shield that is separated from the trailing edge by the write gap, a right side shield which is connected to the trailing shield proximate to the first write pole side and separated from the first write pole side by a first side gap, and a left side shield which is connected to the trailing shield proximate to the second write pole side and separated from the second write pole side by the second side gap.

10. The PMR write head of claim 9 wherein the right corner may be used for right to left (outer diameter or OD to inner diameter or ID) shingled writing and the left corner may be used for left to right (ID to OD) shingled writing.

11. The PMR write head of claim 9 wherein angle $\alpha$ is from about 5 to 45 degrees.

12. The PMR write head of claim 9 wherein angle $\alpha$ is from about 10 to 30 degrees.

13. The PMR write head of claim 9 wherein angle $\beta$ is from about 5 to 45 degrees.

14. The PMR write head of claim 9 wherein angle $\beta$ is from about 10 to 30 degrees.

15. The PMR write head of claim 9 wherein the write gap and trailing shield are substantially conformal to the trailing edge, the first side shield and first gap layer are substantially conformal to the first write pole side, and the second side shield and second gap layer are substantially conformal to the second write pole side.

16. The PMR write head of claim 9 further comprised of a leading shield that is separated from the leading edge by a leading gap, said leading shield is magnetically connected to the right side shield and left side shield.

17. The PMR write head of claim 9 wherein the write pole has a zero neck height, the trailing edge and leading edge are part of tapered surfaces that terminate at the ABS, and the two sides are tapered.

18. A PMR write head for shingled writing, comprising:
   (a) an asymmetrical write pole having a leading edge formed parallel to a substrate along the ABS, a first side that has a greater length at the ABS than a second side and that forms an angle $\beta'$ with respect to a first plane that is perpendicular to the substrate, and a straight trailing edge that intersects the first side at a write corner and the second side at a second corner, said trailing edge has a greater width along the ABS than the leading edge and forms an angle $\alpha'$ at the write corner with respect to a second plane that is parallel to the leading edge, said write corner has a larger pole height than said second corner;
   (b) a first side gap formed adjacent to the first write pole side, and a write gap formed adjacent to the trailing edge; and
   (c) a shield structure including a trailing shield that is separated from the trailing edge by the write gap, and a first side shield which is connected to the trailing shield proximate to the first write pole side and separated from the first write pole side by the first side gap.

19. The PMR write head of claim 18 wherein the first side is on the right side of the write pole with respect to a down track direction and the write corner is used for right to left (OD to ID) shingled writing, or the first side is on the left side of the write pole with respect to a down track direction and the write corner is used for left to right (ID to OD) shingled writing.

20. The PMR write head of claim 18 wherein angle $\alpha'$ is from about 5 to 45 degrees.

21. The PMR write head of claim 18 wherein angle $\alpha'$ is from about 10 to 30 degrees.

22. The PMR write head of claim 18 wherein angle β' is from about 5 to 45 degrees.

23. The PMR write head of claim 18 wherein angle β' is from about 10 to 30 degrees.

24. The PMR write head of claim 18 wherein the write gap and trailing shield are substantially conformal to the trailing edge, and the first side shield and first side gap layer are substantially conformal to the first side.

25. The PMR write head of claim 18 further comprised of a second side shield that is substantially conformal to the second side and is separated from the second side by a second gap layer.

26. The PMR write head of claim 25 further comprised of a leading shield that is separated from the leading edge by a leading gap, said leading shield is magnetically connected to the first side shield and the second side shield.

27. The PMR write head of claim 18 wherein the write pole has a zero neck height, the trailing edge and leading edge are part of tapered surfaces that terminate at the ABS, and the first side and second side are tapered.

28. A method of forming a PMR write head for shingled writing, comprising:
(a) forming a write pole on a substrate and within a non-magnetic layer, said write pole has a leading edge contacting the substrate, a trailing edge formed parallel to the substrate and having a width greater than a width of the leading edge, and two sides of equal length connecting the leading edge with the trailing edge at a first corner where the first side intersects the trailing edge and at a second corner where the second side intersects the trailing edge, said first side and second side each form an angle β with respect to a plane that is perpendicular to the substrate; and
(b) performing an ion beam etch (IBE) process to form a trailing edge that is bowed toward the substrate and leading edge such that the first and second corners have the largest pole height on the trailing edge and a point about midway between the two corners has the lowest pole height, said bowed trailing edge forms an angle α at each corner with respect to a plane that connects the two corners.

29. The method of claim 28 wherein the angle α is from about 5 to 45 degrees.

30. The method of claim 28 wherein angle β is between about 5 and 45 degrees.

31. The method of claim 28 wherein the write pole is formed within a non-magnetic layer that is a dielectric layer, the dielectric layer is removed after the IBE process, and then a conformal side gap is formed along both sides of the write pole, a conformal write gap is formed on the trailing edge, and a shield structure comprised of a side shield and trailing shield is formed adjacent to the side gap and write gap, respectively.

32. The method of claim 28 wherein the non-magnetic layer is a side gap formed on both sides of the write pole and each of said side gaps has a side shield contacting a side of said side gap opposite the write pole.

33. The method of claim 28 wherein the IBE process is performed with a photoresist mask protecting certain portions of the non-magnetic layer and the IBE process comprises ions directed at the trailing edge from a static angle or in a sweeping motion by rotating the wafer during the IBE process.

34. A method of forming a PMR write head for shingled writing, comprising:
(a) forming a write pole on a substrate and within a non-magnetic layer, said write pole has a leading edge contacting the substrate, a trailing edge formed parallel to the substrate and having a width greater than a width of the leading edge, and two sides of equal length connecting the leading edge with the trailing edge at a first corner where the first side intersects the trailing edge and at a second corner where the second side intersects the trailing edge, said first side and second side each form an angle β with respect to a plane that is perpendicular to the substrate;
(b) forming a photoresist mask on a portion of the non-magnetic layer proximate to the first side; and
(c) performing an ion beam etch (IBE) process to form a sloped and straight trailing edge that has a write corner at the intersection of the trailing edge with the first side, and has an angle α' with respect to a plane that is parallel to the substrate and intersects the write corner, said write corner has a greater pole height than a corner of the sloped trailing edge on the second side.

35. The method of claim 34 wherein the angle α' is from about 5 to 45 degrees.

36. The method of claim 34 wherein angle β' is between about 5 and 45 degrees.

37. The method of claim 34 wherein the write pole is formed within a non-magnetic layer that is a dielectric layer, the dielectric layer is removed after the IBE process, and then a conformal side gap is formed along at least one side of the write pole, a conformal write gap is formed on the sloped trailing edge, and a shield structure comprised of a side shield and trailing shield is formed adjacent to the side gap and write gap, respectively.

38. The method of claim 34 wherein the non-magnetic layer is a conformal side gap formed on both sides of the write pole and said side gaps have a side shield contacting a side of the side gap opposite the write pole.

39. The method of claim 34 wherein the IBE process is performed with a photoresist mask protecting certain portions of the non-magnetic layer on a portion of the dielectric layer proximate to the first write pole side and the IBE process comprises ions directed at the trailing edge from a static angle.

* * * * *